3 Sheets—Sheet 1.

J. D. SMITH.
Corn-Planter.

No. 199,113. Patented Jan. 8, 1878.

WITNESSES
C. Clarence Poole
G. W. Breck

INVENTOR.
Joseph D. Smith
By his Attorney
Baldwin, Hopkins & Peyton.

3 Sheets—Sheet 2.
J. D. SMITH.
Corn-Planter.
No. 199,113. Patented Jan. 8, 1878.
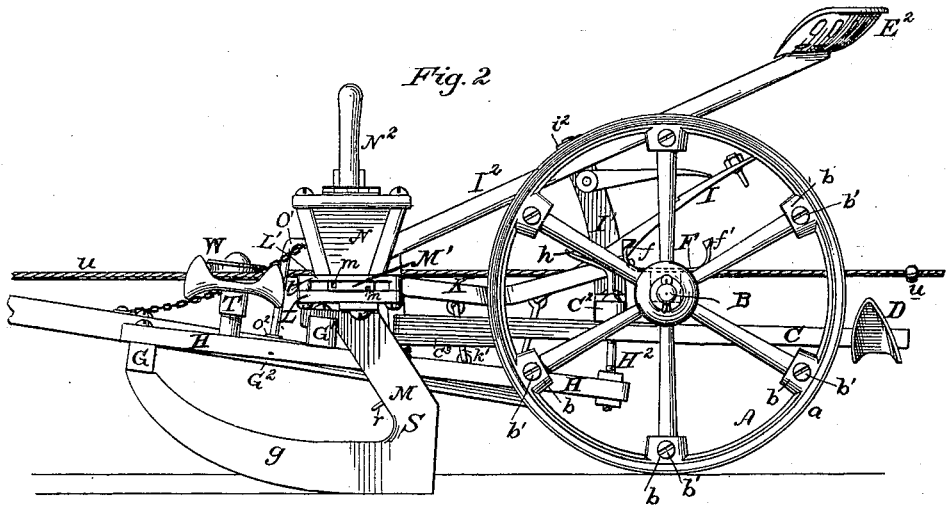
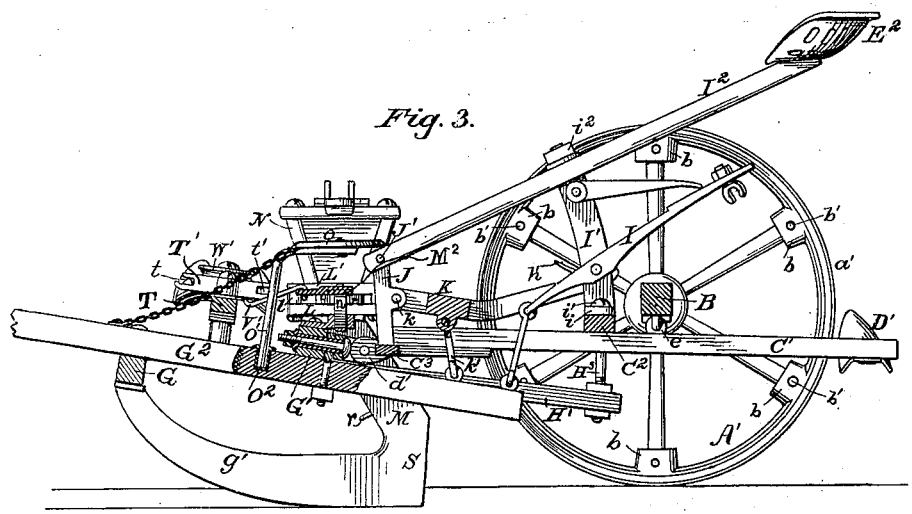
WITNESSES
C. Clarence Poole
G. W. Bruck
INVENTOR
Joseph D. Smith
By his Attorney
Baldwin, Hopkins & Peyton.
N. PETERS, PHOTO-LITHOGRAPHER, WASHINGTON, D.C.

3 Sheets—Sheet 3.

J. D. SMITH.
Corn-Planter.

No. 199,113.  Patented Jan. 8, 1878.

WITNESSES.
C. Clarence Poole
G. W. Breck

INVENTOR
Joseph D. Smith
By his Attorney
Baldwin, Hopkins & Peyton

UNITED STATES PATENT OFFICE.

JOSEPH D. SMITH, OF ROCKFORD, ILLINOIS, ASSIGNOR OF ONE-HALF HIS RIGHT TO RALPH EMERSON AND WM. A. TALCOTT, OF SAME PLACE.

IMPROVEMENT IN CORN-PLANTERS.

Specification forming part of Letters Patent No. 199,113, dated January 8, 1878; application filed September 20, 1877.

*To all whom it may concern:*

Be it known that I, JOSEPH D. SMITH, of Rockford, in the county of Winnebago and State of Illinois, have invented certain new and useful Improvements in Corn-Planters, of which the following is a specification:

My improvements chiefly relate to a corn-planter of the class in which the seed carrying, regulating, and discharging devices are mounted upon a supplementary runner-frame in front of the main frame and supporting-wheels, such, for instance, as shown by United States Letters Patent No. 180,665, granted my assignees August 1, 1876; and the objects of my invention are, generally, to increase the efficiency of the machine, to place the various working parts thereof thoroughly under control, and, more especially, to simplify in construction and render more perfect in operation the devices for distributing or supplying and conducting or conveying and discharging the seed.

The subject-matter claimed will hereinafter specifically be designated.

The accompanying drawings illustrate all my improvements as embodied in a single machine. Obviously, however, some of the improvements may be used without the others, and in machines differing somewhat in construction and operation from that therein shown and hereinafter described.

Figure 1:
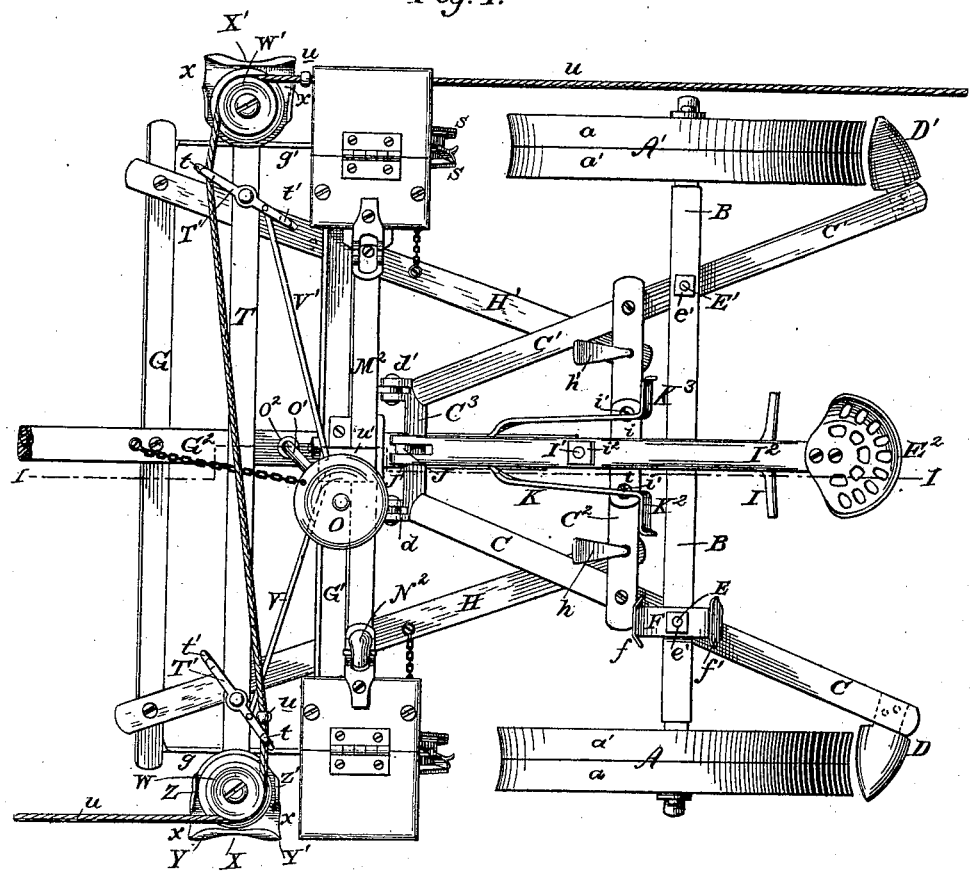
Figure 4:
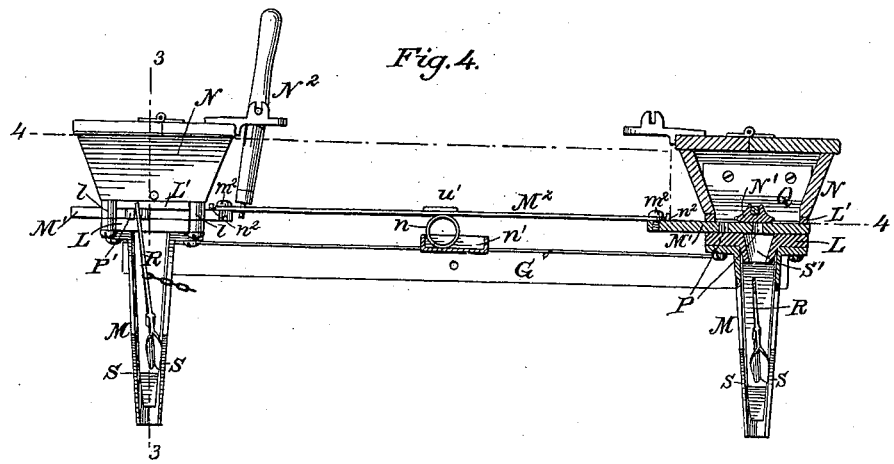
Figure 5:
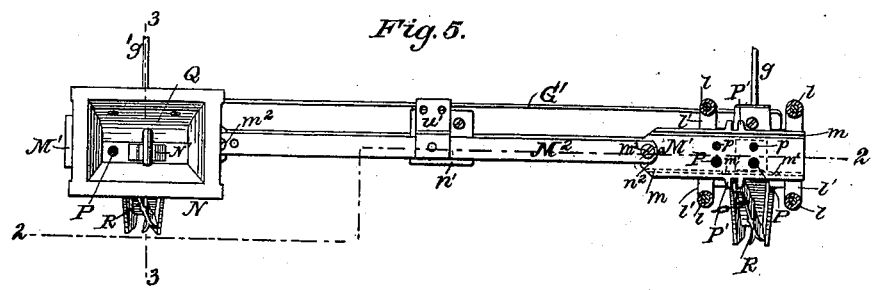
Figure 6:
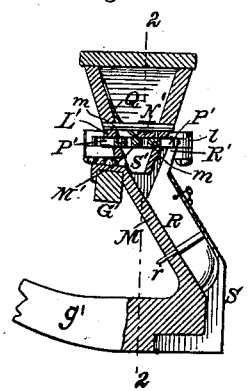
Figure 7:
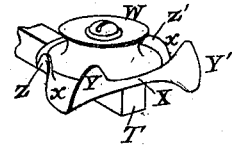

Figure 1 is a plan or top view of my improved planter, adapted for "check-row" planting; Fig. 2, a side elevation of the same; Fig. 3, a longitudinal view, partly in elevation and partly in section, on the line 1 1 of Fig. 1. Fig. 4 is a rear elevation, partly in section on the lines 2 2 and 2 2 of Figs. 5 and 6, showing the hoppers, the "shake-bar," the seed-conducting channel or "open-heel" conveyer, and parts connected therewith; Fig. 5, a plan or top view of parts shown in Fig. 4, with one of the hoppers detached and the pillars of its support or sustaining-frame in section on line 4 4, Fig. 4; Fig. 6, a vertical central section through one of the hoppers and open-heel conductors, and parts connected therewith, on the lines 3 3 and 3 3 of Figs. and 4 and 5; and Fig. 7 is a view, in perspective, of one of the check-row cord-rollers and its flanged curved plate or cord-guideway.

Supporting-wheels A A' for the frame of the machine have concave peripheries or treads, and are, preferably, each formed with a double or two-part tread or rim, two halves or equal sections, $a$ $a'$, exactly corresponding with each other, composing the rim. The wheels are mounted loosely upon suitable bearings at the ends of the axle B. The sections $a$ $a'$ are cast from the same pattern, or from precisely similar patterns, with half-sockets $b$ for the ends of the spokes formed upon each section. When fitted together and secured by screws passing through the sockets, as well as through the spokes, a strong smooth concave-surfaced wheel is provided to cover the seed deposited in the furrow before it, in the usual well-known way. By forming the wheel in sections it is obvious that the work of making patterns and casting and finishing the rims and spoke-sockets is cheapened and simplified. The two-part or open-holders or half-sockets for the spokes are easily cast of any shape desired to hold the spoke against endwise movement. In fitting the sections together it is only necessary to cut the spokes to the right length and properly shape their ends, when, they having been previously secured in the hub, the sections of the rim are brought together against opposite sides of the spokes' ends and secured by the screws $b'$, as before mentioned. Screws or their equivalents may be passed through the sockets at the sides of instead of through the spokes, if preferred; or corresponding or matched lugs other than the sockets in each section may serve to unite the two halves of the rim. Broken or damaged spokes may readily be replaced simply by taking apart the sections of the rim; and it is obvious that in event of injuring or breaking one section of the rim it may be renewed at about half the cost of an entirely new rim, and without injury to the remainder of the wheel.

The wheels and axle support a main frame of skeleton form. This frame is lightly made, and is chiefly composed of three main parts— two diagonal bars, C C¹, diverging from front to rear, and a cross-bar, C², parallel with and in front of the axle B. Fixed scrapers D D¹ are carried by the main frame, being mounted on the rear ends of the diagonal bars C C¹.

These scrapers are shown as correspondingly constructed, of peculiar form, each being much like a cultivator-tooth, having sharp beveled edges, and in cross-section of a concavo-convex form, and coming to a point at the outer end. The diagonal bars C C$^1$ and cross bar or brace C$^2$ are securely united by removable bolts or otherwise. The frame is completed by a connecting-yoke or forked or angular metal plate, C$^3$, suitably secured to and uniting the front ends of the bars C C$^1$. This yoke has ears or forked lugs d d', for a purpose hereinafter to be explained. A strong light main frame is the result of the above construction.

The scrapers D D$^1$ serve to clear the wheels of any mud or clogging matter which may adhere to them. The wheels are moved toward or away from the scrapers by giving the axle a backward and forward movement. This movement is imparted by rocking the axle on its hinged connection with the frame. The frame is jointed to the under side of the axle by eyebolts E E$^1$ and e, respectively secured to the axle B and frame-bars C C$^1$. A strong, simple, jointed connection of the frame to the axle, and one admitting of the necessary amount of backward and forward play, is thus provided. The driver, from his seat E$^2$, is enabled to rock the axle by placing his foot on a rest, F. The driver, by properly applying his weight to the rest, can roll the axle in either direction—forward to throw the scrapers out of contact with the wheels, and backward to bring the scrapers into operation. This rest is of peculiar construction, being composed of a casting having two bearings or foot-supports, f f', the former of which is used to move the axle forward, and the latter to rock it backward. But a single rest is shown, although two may be employed, one on either side of the seat, and it is secured to the axle by the nut e', which detachably fastens the eyebolt E in place.

The scrapers are removably secured to the rear ends of the frame by screws passing through the scraper-shanks into the ends of the bars C C$^1$, which extend back of the wheels, (see Fig. 3, and dotted lines Fig. 1,) and the scraper-shanks each project at an angle, being arranged at an acute angle to their working parts or edges, thus causing the scrapers to cross the periphery of the wheel diagonally instead of at right angles. The mud or hard-baked clay is thus more readily removed, and with less of a brake-action on the wheels, as a drawing or oblique cut is given instead of a straight or transverse cut.

The scrapers are reversible and interchangeable. When the edges in use of one or both scrapers becomes worn they are detached, turned to bring their opposite edges in front, and changed from one wheel or one side of the machine to the other, and twice as much wear may thus be gotten out of a scraper.

A supplementary or runner frame may be constructed of skeleton form in any well-known way, being shown, in this instance, as mainly composed of stout front and rear parallel bars G G$^1$, centrally connected and braced by the rear end of the tongue G$^2$. The trenching-runners g g' support the supplemental frame and open the furrows for the seed, as usual; and this frame is united to the main or supporting frame by means of a joint or hinge, which admits of the rocking or vibrating of the supplementary frame to a limited extent, both longitudinally and transversely, independently of the movements of the main frame. The joint between the two frames is formed by a pivoted cross-head or lugged rocking plate secured to the rear piece G$^1$, and connected to the lugs d d' of the plate C$^3$, and otherwise constructed as in the before-mentioned Letters Patent No. 180,665, granted myself and others, as my assignees, August 1, 1876.

Diagonal bars or hounds H H$^1$, converging rearwardly and attached to both of the bars G G$^1$ of the runner-frame, serve to brace this frame, being secured at their front ends upon the top of the bar G, and, passing beneath the bar G$^1$, extend back beneath and cross beyond the bars C C$^1$, respectively. Rods H$^2$ H$^3$, adjustably secured in the rear ends of these bars H H$^1$, pass up through openings in the cross-piece C$^2$ of the main frame within reach of the feet of the driver from his seat. Sandal-plates or foot-rests h h' on these rods enable the driver to use the hounds H H$^1$ as levers to press the runners into the ground. It sometimes happens that one runner works upon harder ground than the other, and in such cases the driver can readily cause the runners to perform uniform work by rocking the frame on its hinge with the main frame.

A lever, I, is pivoted upon the seat upright or standard I$^1$, and is provided with foot-rests, a pawl, and stops, as and for the purposes set forth in the before-mentioned Letters Patent of August 1, 1876. The seat beam or lever I$^2$ is mounted intermediate its length upon the standard I$^1$, which is securely fastened upon the cross-bar C$^2$ by flanges i and bolts i$^1$, or in other suitable way. The seat or carrying-beam I$^2$ is detachably secured, at or near its center, upon the standard by a screw-thread and nut, i$^2$. The seat E$^2$ is mounted upon the rear end of the beam, and its forward end is hinged or pin-jointed at J' to an upright, J, upon the yoke or forked plate C$^3$, at the front end of the main frame, and forming part—the fixed section—of the hinge between the two frames, as before described. To this upright J of the fixed hinge-section C$^3$ is also pivoted a forked lever, K, for pressing the runners into the ground when the condition of the earth requires. A pivot, k, passes through the divided or recessed end of this lever and through a lug on the rear edge of the rigid standard J.

The branches of the bifurcated lever project backward, and terminate within reach of the feet of the driver on each side of the upright $I^1$ in foot-rests $K^2$ $K^3$.

A link-connection, $k'$, between the lever, near its front end, and the tongue-extension, or rear end, serves to operate upon the supplementary frame.

The levers I and K and the seat beam or standard $I^2$, it should be noticed, are all fulcrumed in the plane of vibration or axis of oscillation of the hinge connecting the frames, and the links connecting the levers and tongue are arranged in the same plane, to prevent binding or cramping of the joints, as well as to avoid twisting or rolling of the levers about their longitudinal axes.

By the system of levers and manner of mounting the seat above described, it will be seen that the driver has the machine, so far as regards the movements of the runner-frame, completely under control. By keeping his weight mainly upon the seat he is enabled to nearly balance the machine, when desired to make shallow furrows or trenches; and by the levers he can raise, lower, or adjust to the nicest degree the movements and working of the runner-frame.

The standard J on the main-frame section of the hinge may be made longer or shorter than shown, according to the elevation it is desired to give the driver's seat, or to suit the length of its beam $I^2$.

The trenching-runners are connected at the front ends with the cross-bar G, and at their rear ends with the cross-bar $G^1$, by means of seed-conveying channels or conductors M M, in manner somewhat similar to that shown and described in the before-mentioned Letters Patent No. 180,665, and hoppers N N are secured upon supports; and seed-slide guideways, consisting of centrally-slotted bottom plates L L, secured to bearings upon the seed-conductors, upper parts $L'$ $L'$, and tubular studs or short pillars $l$ at the corners, through which pass screws for detachably connecting the upper and lower sections of the hopper-supports and guideways. The upper plates $L'$ $L'$ have central openings corresponding with those in the bottoms of the hoppers, to allow the seed to rest upon the reciprocating seed-slides $M^1$ $M^1$, which are formed of such a thickness as to work snugly and freely in the ways formed between the plates L L $L'$ $L'$.

So far as just described, the hoppers, their supports and seed-slide guideways, and the seed-slides are essentially the same in construction as in the said Letters Patent No. 180,665, and I prefer to employ gravity cut-offs $N^1$, as in said patent. Instead, however, of having the seed-slide $M^1$ work with the edges close to or against the spacing-posts or separating-pillars $l$ $l$ $l$ $l$ of the guideway-sections L and $L'$, so that said pillars constitute guideways or guards against lateral displacement of the slides, as in the before-mentioned Letters Patent, I widen these plates or sections, or provide them with sidewise-projecting arms $l'$, to leave spaces between the pillars and the sides of the slides, for a purpose hereinafter explained.

Lateral movement of the slides is prevented by longitudinal grooves or channels $m$ $m$ on both their faces, or upon their upper and under surfaces, one in each, near their edges. These grooves fit upon guides shown as formed by pins or small studs $m^1$ $m^1$, (shown by dotted lines, Fig. 5;) but, if preferred, a single rib might be substituted for the pins, which are located upon and project slightly above the upper surfaces of the under sections or plates L of the guideways and hopper-supports; or the guides and grooves might be reversed, the pins placed upon the slides, and the grooves made in the plates. These pins compel the slides to move back and forth in a straight path when reciprocated by the shake-bar $M^2$. This bar is detachably connected with the slides by screws $m^2$ $m^2$ at its ends. A lever, $N^2$, which may be connected with the shake-bar at either end, and be fulcrumed upon one or the other of the hoppers, or otherwise mounted, as usual, serves to reciprocate the slides in a well-known way.

To lessen friction and tendency to bind or strain the shake-bar rod, it is supported beneath its center by a roller or ring, $n$, which balances, or nearly balances, the weight of the reciprocating bar at all times. This roller is supported, and traverses to and fro, in a bracket guideway or trough, $n^1$, supported on the cross-bar $G^1$ of the supplementary frame, to which it may be secured by screws to admit of its removal, or in other suitable way. The guide-trough $n^1$ has closed ends, and thus serves to prevent undue movement or accidental displacement of the roller.

A swinging or turning dropper's seat, O, is mounted between the hoppers in such manner that the boy or other attendant who works the lever $N^2$ to operate the shake-rod and drop the seed can adjust the seat so as to suit himself and face either hopper. The seat is fixed upon a curved standard, $O^1$, mounted, and capable of turning freely at its lower end, in a socket or bearing, $O^2$, in the tongue.

The boy who does the dropping is enabled to adjust the seat to the most convenient position to accommodate the length of his legs, and permit of his using either or both hands to work the lever. The seat may be removed, if desired, by lifting its standard out of the socket.

Each of the seed-slides $M^1$ is reversible—that is, it may be used either side up to regulate the amount of seed dropped, more or less seed being distributed or supplied according to which side of the slide is uppermost. Each slide is provided with two sets or pairs of seed openings or cells, arranged on opposite sides of its longitudinal center, and in each edge of the slide there is a notch to engage with a valve in the seed-conveying channel, presently to be described. The openings P on one side of the center of the slide are larger than those, $p$, in the opposite side, and the notches $P'$ to engage the valve R in the seed-channel are formed between lugs projecting in pairs from the edges of the slide directly opposite each other. Each hopper is provided with an inclined shield or guard, Q, projecting inward at the bottom, and diminishing the width of the opening in the hopper-bottom about one-half. Instead of this shield or deflector the grain might be directed to one side of the hopper-bottom by properly shaping the side of the hopper or box itself, so that one of the longitudinal edges or sides of the opening in its bottom should be about over the longitudinal center of the slide, to direct the seed to the exposed openings P in the slide and cut it off from the inoperative cells $p$. The guard, however, is preferable, as it may be detachably secured to the inside of the hopper, so that old hoppers can be suited to the reversible seed-slide, and the hopper be employed, by removing the deflector, with other forms of slides, such, for instance, as in the aforesaid Patent No. 180,665. The lower edge of the deflector Q lies close to the slide. To reverse the slide, all that is necessary to do is to remove the screw $m^2$ connecting it with the shake-rod, disconnect the valve in the seed-conveying channel from the notch P', draw out the slide at the inner end of the hopper, (ample room to do which is afforded, as the pillars $l\ l$ are sufficiently far apart to allow the lugs on the sides of the slide to pass freely between them,) turn the slide over, shove it back in place between the sections L L' of the guideway and hopper-support, taking care that the groove $m$ fits upon the pins $m^1$, replace the screw $m^2$, and engage the channel-valve with the new notch. This change brings a new and different-sized set of seed-cells beneath the cut-off $N^1$, which is located between the guard Q and opposite side of the hopper.

I thus avoid removing the hopper or disconnecting the hopper-supporting plates and guideways for the slide, while providing prominent notches to engage the stem of the valve in the conducting-channel, and admitting of a quick change in the amount of seed deposited. Stops $n^2$ on the slides serve to limit their movement.

The seed-conveying channels or conductors M and the "flapper"-valves R, combined therewith, are somewhat peculiar, both in construction and as regards the manner of arranging them relatively to each other.

The open-back channel, or "open-heel" conductors, as I prefer to term them, are inclined, as shown, open at the rear from top to bottom, and their sides square-edged or vertical, or nearly so, at their lower ends S, where they join or terminate in the recessed or channeled heels of the runners.

It will thus be seen that a trough-like or entirely open-back channel, to convey the seed from the hopper as it is distributed by the slide to the trench, is provided, giving an unobstructed view of the seed throughout the length of the open-heel conductor, which is very desirable. To accomplish this a sufficient degree of slant or inclination of the open-heel conductor is given, as shown, to insure the grain, while sliding down, being held in the channel by gravity only, without requiring any back or cover to prevent it from bounding out of the channel or over its sides. The sides of the channel are preferably made to flare slightly, thus giving a better view, and reducing the width of the bottom or inclined surface down which the seed slide; and I also prefer to taper it slightly from top to bottom, to somewhat contract its lower or discharge end, and to correspondingly form the runner-heel.

To more perfectly insure a smooth, gliding, or steady downward movement of the seed, and prevent all tendency it might have to jump from or bounce about in the open-heel conductors on its way to the ground, I employ seed deflectors or controllers $S^1$, (see Figs. 4 and 6,) cast with or attached to the under side of each of the bottom plates L of the seed-slide, guideways, and hopper-supports. The back or bottom of the deflector is inclined in a direction the contrary of that in which the open-heel conductor slopes. The seed, after passing through the seed-slide, are thus deflected forward before they strike the conductor's inclined bottom, and rendered less likely to bound out by this deflector, which may either extend sufficiently far beneath the seed-slide and toward the front of the machine at its lower end to cause the grain to strike first upon it and then slide onto the conductor, or it may serve simply as a guard against the bounding of the grain downward and backward, which they have otherwise some tendency to do.

The deflector is shown as three-sided—that is, open at front, and having inclined sides and back—thus guarding against clogging. The back and sides converge toward their lower ends. Its lower edge is sufficiently above the bottom of the conductor to allow the grain freely to pass downward. The deflector back or bottom, without the sides, would serve a good purpose.

The flapper-valve is formed with an enlargement on wings at its lower end for a well-known purpose, and at its upper end is formed with an arm or shank, R', to engage between the lugs at the edge of the seed-slide, as hereinbefore described. The valve is provided with a straight-edged bottom, to play upon the smooth plane-surfaced inclined bottom of the conductor.

To facilitate the reversing of the seed-slide, and cheapen and simplify the device, the conductor-valve is pivoted by a pin, $r$, passing through the bottom of the seed-conductor, and the valve held down to its work by its weight or gravity. It may thus be secured or dropped in place quickly at the open back of the distributer, with its end or shank engaging the seed-slide notch, and readily be removed simply by drawing its pivot out backward and upward. As the seed drop from one cell or opening in the reciprocating seed-slide by its movement in one direction, they are held by the valve on one side until the return movement of the slide, when the valve releases the seed already in the open-heel conductor, and receives another "hill" or supply of seed, and so on, as is customary.

The wings of the valve, it should be observed, are rounded at their edges, or curved upward and outward sidewise, so as to form, in connection with the sides of the conductor, pockets in which to hold the grain, first at one side, and then at the other. A simple straight flange or cross-head at the lower end of the valve would not answer, as the seed would escape; but the wings should be made as described, or in an equivalent way, so as to embrace or partially inclose the seed at the back, so as to prevent them from spilling or jolting out at improper times, and yet allow the seed being seen while at rest.

From the above description and the drawings the operation of the machine as a hand-dropper will be readily understood. When to be used as a check-row planter, a cross-bar, T, mounted upon the supplementary frame and serving to support the check-row attachments, is employed. The check-row attachments may be left upon the machine when they are not employed, as they are light, are but little in the way, and the devices employed few in number; or, if desired, they may be removed when the dropping is to be done by hand, the attachments being made detachable for this purpose. They may either be taken off bodily by removing their frame or supporting-bar T, or be separately removed, and this bar be left as a brace to the supplementary frame, with the diagonal cross H H¹ of which it is shown as connected. Centrally-pivoted vibrating levers T′ T′, having their opposite ends alike formed with prongs or notches $t\ t'$, to form guides to engage and admit of the passage through them of a knotted rope, U, or its equivalent, are connected with the shake-bar M², or with a forwardly-projecting bracket, $u'$, thereon by hook-ended rods or links V V′. At the ends of the bar T are freely-revolving horizontal wheels or pulleys W W′, around which the rope passes, with its ends extending in opposite directions across the field when the machine is in operation. Peculiarly flanged and curved plates X X′, upon which the bases of the pulleys rest, serve as guides or controllers for the rope.

When planting, the rope is staked as usual, passed around the pulleys, and engaged with the notched or forked vibrating arms or levers, as in Fig. 1. As the machine advances, the knots or rings $u$ on the rope come in succession in contact with first one and then the other lever. As the rope passes to the front end of one lever and the rear end of the other, or engages them on opposite sides of the center or pivot of vibration, it is obvious that the levers each will be swung in the same direction by the contact of a knot with either of them, and that as the knot passes from the first operated lever to the other and engages it, both levers will be moved in a corresponding direction, but opposite to that in which they were previously moved. Thus the contact of one of the knots, first with one and then with the other lever, completes a reciprocation or to-and-fro movement of the shake-bar and seed-slides. The reciprocations continue across the field, and correspond in number with the knots or beads on the rope. At the end of the rows, when the edge of the field is reached, and the return-passage of the machine across the field to be made, the rope is shifted so that it engages the end of each lever the opposite of that which it previously operated upon.

The pulley plates or castings X X′ are formed exactly alike. Each has a front and rear guideway, $x\ x$, formed by giving a downward curve to the metal between the front and rear flanges or ears Y Z Y′ Z′. These guideways serve to control the rope by insuring its being properly guided to the machine, and causing it to pay out or leave it correctly in precisely similar manner, and with equally good effect, whichever way the machine may be going. The lips Z Z′ guard against accidental disconnection of the rope from the pulleys, should it become kinked or slacked.

I claim as my invention—

1. The concave-rimmed planter or covering-wheel, with its rim constructed in two equal sections, having divided spoke-sockets formed in part upon each section, and adapted to be secured together, substantially as hereinbefore set forth.

2. The combination, substantially as hereinbefore set forth, of the sectional concave rim, having spoke-sockets formed in part upon each section, the hub and the spokes independently secured in the sockets.

3. The scrapers constructed, as hereinbefore described, of a concavo-convex form in cross-section, having sharp edges, pointed ends, and angular shanks, whereby they are rendered reversible and interchangeable, and adapted to operate obliquely to the rims of the wheels.

4. The combination, substantially as hereinbefore set forth, of the diverging main frame, the diagonally-acting scrapers, secured to the rear ends thereof, and the rocking axle, for the purpose specified.

5. The combination, with the rocking axle, of the foot-rest F, having front and rear bearings $f\ f'$, for the purpose specified.

6. The combination of the main frame, the supplementary or runner frame, the hinge connecting them at their adjacent ends, the seat-standard, the seat-beam mounted thereon, and the upright upon the yoke-plate or fixed section of the hinge, to which upright the seat-beam is pivoted at its forward end, these members being constructed and operating substantially as hereinbefore set forth.

7. The combination and arrangement, as hereinbefore set forth, of the main frame, the supplementary frame hinged thereto, the tongue-extension projecting to the rear of the supplementary frame, the forked lever, provided with foot-rests at the rear ends of its branches, and pivoted at its forward end to an upright of the hinge connecting the two frames, and the link-connection between said lever and the tongue, for the purpose specified.

8. The combination of the main frame, the supplementary or runner frame, the hinge connecting their adjacent ends, the seat-beam mounted upon the standard on the main frame, the yoke-plate or fixed hinge-section secured to the main frame, its upright, to which the seat-beam is pivoted, the forked lever beneath the seat-beam, the tongue-extension, the connection between the extension and said lever, and the joint between the lever and the fixed hinge-section upright, these members being constructed, arranged, and operating as hereinbefore set forth, whereby the driver is enabled to increase or diminish the pressure upon the runner-frame, as specified.

9. The combination of the seed-slide guideway and hopper-supporting plates or sections, having side arms, the separating pillars connecting said sections at the ends of the arms, the seed-slide, having edge notches formed between lugs, and fitting between the sections, so as to leave spaces between its edges and the pillars connecting the sections, to admit of the withdrawal of the lugged slide, and the shake-bar, to which the slide is detachably fastened, these members being constructed and operating substantially as hereinbefore set forth.

10. The hereinbefore-described reversible seed-slide, having a longitudinal groove on each face and near its opposite edges, and two sets of seed-cells, arranged on opposite sides of its longitudinal center, whereby the slide is adapted to be guided in its reciprocations either side up, and the amount of seed dropped can be regulated simply by turning over the slide.

11. The combination, substantially as hereinbefore set forth, of the hopper-supports and seed-slide guideways, the grooved reversible sleed-slides, each having two sets of seed-cells, and guided by projections on the guideways, and the shake-bar, detachably connected with the seed-slides.

12. The combination, substantially as hereinbefore set forth, of the hopper, its guard or deflector secured to one side thereof, and serving to narrow the width of the opening in its bottom, the reversible seed-slide, having two sets of seed-cells, arranged one on either side of the longitudinal center of the slide, and the cut-off working between the guard and opposite side of the hopper, whereby the grain is dropped through one set of openings in the slide while the other set is protected, and the grain prevented from access thereto.

13. The combination of the supplementary or runner frame, provided with the hoppers and their seed-distributing devices, and the adjustable turning dropper's seat, mounted on the curved standard between the hoppers, substantially as hereinbefore set forth, whereby the dropper is enabled to face either hopper to work the shake-bar lever, and may otherwise adjust the seat to suit him, as set forth.

14. The combination of the inclined open-heel conductor open at the back, and the runner, having a channeled heel, with which the conductor joins at the lower end, these members being constructed and operating as described, whereby an unobstructed view is given of the seed passing down the conductor, and bounding or scattering of the seed prevented.

15. The combination of an inclined open-heel conductor open at the back, and depending on its inclination to keep the falling seed from bounding out behind, with a pivoted valve operating therein, these members being constructed substantially as set forth, so that the seed is in view while descending the incline on either side of the valve.

16. The combination of the inclined open-heel conductor, and the deflectors or seed-controllers beneath the seed-slide, as and for the purposes specified.

17. The combination of the open-heel conductors, inclined and having a plane-surfaced bottom, the flapper-valve loosely pivoted in the conductor, and the seed-slide with notches in its edge, in which the valve-shank engages, substantially as hereinbefore set forth, whereby an unobstructed view of the grain in the conductor is afforded, and the valve may quickly be lifted out or moved in the open-heel conductor to admit of reversing the seed-slide.

18. The combination of the supplementary frame, the centrally-pivoted levers, having corresponding guides or notches in their ends for the passage of the knotted rope, the shake-bar, the connections between said bar and the levers, the pulleys, and the rope guiding and controlling plates, these members being constructed and operating substantially as hereinbefore set forth.

In testimony whereof I have hereunto subscribed my name.

JOSEPH D. SMITH.

Witnesses:
JNO. W. HEPBURN,
JNO. M. WENDELKEN.